Dec. 23, 1941.   W. F. HEROLD   2,267,403
FURNITURE CASTER
Filed Sept. 25, 1940
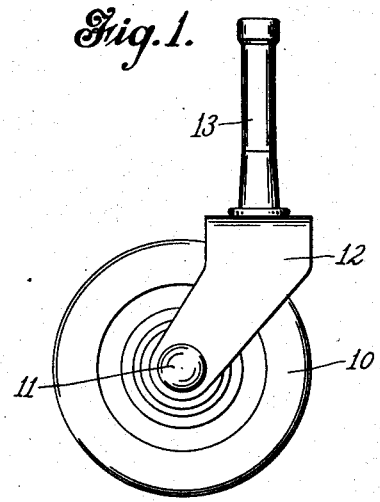
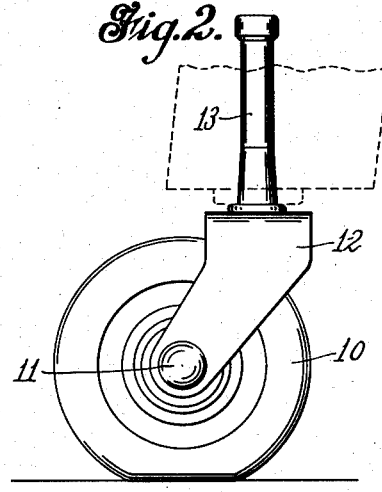
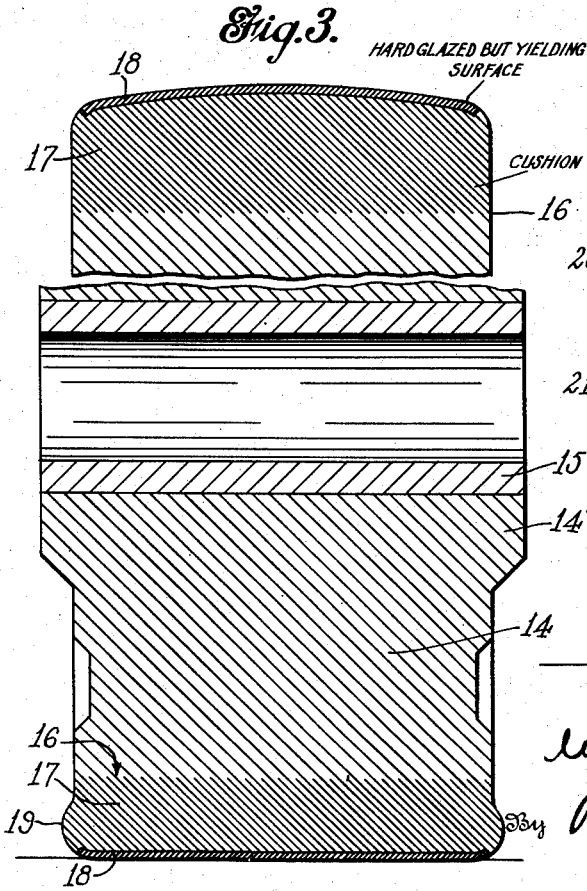
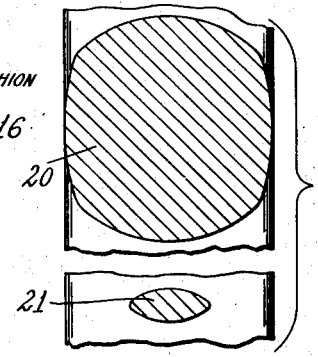
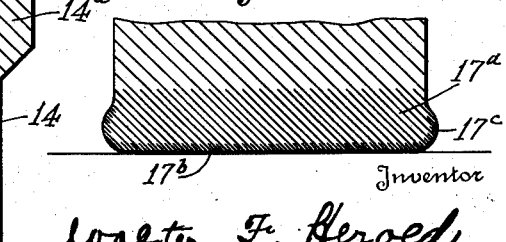
Inventor
Walter F. Herold,
By Rockwell & Bartholow
Attorneys Patented Dec. 23, 1941

2,267,403

UNITED STATES PATENT OFFICE 2,267,403

FURNITURE CASTER

Walter F. Herold, Easton, Conn., assignor to The Bassick Company, Bridgeport, Conn., a corporation of Connecticut Application September 25, 1940, Serial No. 358,268

5 Claims. (Cl. 16—45)

This invention relates to furniture casters such as employed on office furniture, where the wheel engaging the floor is formed of elastic material, for example, a rubber or rubber-like compound.

In providing casters for desks, chairs, and other furniture used in offices where the office floors have been covered with linoleum or other hard material, it has been the practice to supply a caster wheel having a relatively soft and yielding periphery. Such a wheel would be deformed by the weight imposed upon it to such an extent that it would present a relatively large surface in engagement with the floor, obviating the pitting or denting of the surface, which pitting or denting would take place if the engaging surface of the wheel were too small.

It has been known, however, that caster wheels of the type above mentioned, having relatively soft peripheral portions, have been entirely unsuitable for rooms in which the floors are covered by carpets or rugs. One reason for this is that the soft rubber has a very injurious action on the woven floor covering. The rubber is pressed or forced into the interstices of the weave in such a manner that when any swivelling action of the caster takes place, there is wear of the carpet or rug, and in many cases serious damage or even destruction, due to the strong pull exerted by the wheel on the nap or pile. Moreover, the swivelling action is seriously interfered with so that the chair cannot be moved in the desired manner. The result has been that the use of soft rubber caster wheels on carpets and rugs has been strictly avoided by those familiar with the facts above mentioned, and for a long period of time it has been customary to provide the furniture on carpet-covered floors with wheels having hard and relatively slippery surfaces.

One of the objects of the present invention is to provide a caster wheel which will meet both of the above-mentioned conditions, that is, be usable in a satisfactory manner on either a hard, smooth floor or on a carpeted surface.

Another object is to permit office furniture to be provided with casters such that the shifting about of the furniture and the allocation of it to carpeted or uncarpeted rooms is a matter of indifference.

To these and other ends the invention consists in the novel features and combinations of parts to be hereinafter described and claimed.

In the accompanying drawing:

Fig. 1 is a side elevation of a caster embodying my improvements;

Fig. 2 shows the flattening of the wheel under full load;

Fig. 3 is a vertical partly broken section of the wheel in the condition of Fig. 2, on a greatly enlarged scale;

Fig. 4 is a diagrammatic view comparing the floor contact area of the wheel selected for illustration with that of a wheel of the same size which is of the kind heretofore used on carpeted floors; and Fig. 5 is a fragmentary sectional view of a caster wheel of somewhat modified form.

In meeting the conditions above mentioned, that is, providing a caster wheel or roller which can be used successfully either on a hard, smooth floor or on a carpeted floor, I provide a wheel, usually formed by a molding process, in which the body is of a rubber or rubber-like compound. In order to meet the various conditions, the body in different localities varies in hardness and in other characteristics. In order to be suitable for use on a linoleum surface, for example, the wheel when fully loaded should provide a relatively large contact area which will obviate denting or pitting of the linoleum. In order to obviate the working of the rubber periphery of the wheel into the fabric of a carpet or rug, it is required that the contacting portion have the requisite amount of hardness or rigidity, and its outer surface should have the requisite amount of slipperiness or smoothness in order to reduce as much as possible the wear on the yarns of the fabric.

In the drawing, I have shown a caster having a wheel 10 mounted in the customary manner by an axle 11 in a horn 12 of the usual type, having an upwardly extending pin or pintle 13. The wheel 10 is molded from rubber and has a hub portion 14ª surrounding the usual metallic bushing 15. The hub portion 14ª is at the inner part of a molded rubber body having a relatively hard core portion 14 which extends outwardly to a region near but not at the tread of the wheel. The outer limit of this core is indicated in the drawing at 16. From this zone outward the rubber is softer. The softer portion of the rubber is indicated at 17, and this cushion portion extends almost to the periphery or floor-engaging surface of the wheel, but at the periphery there is a relatively thin zone of somewhat harder and yet somewhat flexible or yielding material, as indicated at 18.

The portion 18 is represented as consisting of a thin, hard, yet flexible skin or veneer, preferably of rubber, having a thickness of a few thousandths of an inch, vulcanized to the wheel body in such a manner as to provide an integral structure. The outer surface of this veneer strip is smooth and polished, and preferably, in fact, somewhat glazed so as to reduce friction on a carpet on which the wheel rolls; yet notwithstanding these characteristics of the surface or tread portion of the wheel, the floor-contacting portion flexes or deforms under full load without breakage or rupture. The deformation of the lower part of the wheel under full load is shown in Fig. 3, which is a transverse section of the wheel, and it will be noted that the tread portion flattens substantially, with axial displacement of the soft rubber or cushion portion 17 indicated at 19, this displacement causing a perceptible peripheral bulge at each face of the wheel. It will also be observed that the slight crown normally existing in the tread portion of the wheel (shown at the upper part of Fig. 3) is eliminated at this location, the wheel contacting the floor substantially throughout the width of the wheel, and the veneer strip 18 in this portion of the wheel being substantially flat and straight in an axial direction, as shown in the drawing.

In Fig. 4 the floor-contacting area of the wheel under full load is indicated by the hatched portion 20. This view, of course, is on a somewhat smaller scale than Fig. 3, but it indicates the relatively large area presented to the floor, which area for a considerable part of the periphery of the wheel extends substantially to the wheel sides. Such an area prevents denting or pitting of a linoleum surface. At the lower part of Fig. 4 I have shown diagrammatically the wheel-contacting surface of a hard rubber wheel of the same size such as customarily used on carpeted floors. The floor-contacting area of such hard wheel under full load is indicated by the hatched portion 21.

As regards the relative hardness of the different parts of the wheel, it may be said that I prefer, where the inner core portion of the wheel has a hardness of 100 by a Shore's Type A "Durometer," to provide a cushion portion 17 having a hardness of the order of say 60, while the thin but yielding floor-contacting portion 18 has a hardness of 90 or 92, but usually not above 95.

It is preferred that the veneer or skin at the tread be of only slightly less hardness than the core, and that it be able to flex to the position of full load without breaking but have little more than that amount of flexibility.

In the modified form shown in Fig. 5, the separate veneer or skin is replaced by a skin formed as a continuation of the soft rubber portion 17a. This may be brought about by a suitable hardening of the surface of the soft rubber portion. In the case illustrated the entire peripheral or tread portion 17b of the soft part is treated to harden it, and also portions 17c at the sides of the wheel. This may be done, for example, by a halogen treatment of that part of the wheel surface which is to be hardened.

The importance of having the floor-contacting surface of the wheel absolutely smooth needs to be stressed. This is not easy to achieve in the production of a molded rubber article. If the outer surface of the cushion portion at the wheel periphery is to be hardened by halogen treatment or acid treatment, the surface should first be prepared with special care, because otherwise the finished article will not have the requisite surface smoothness. With this in mind I recommend preliminary treatment of the molded wheels in a rolling barrel for an extended length of time while subjected to an abrasive powder in the presence of a suitable liquid, and with heavy superimposed weight. Such a treatment will enable the requisite surface smoothness to be attained. After being taken out of the rolling barrel the wheels undergo the treatment for surface hardening of their cushion portions. After contacting their surface portions with a gas or other hardening agent for the required length of time, and the completion of hardening and vulcanization in this manner, the tread surface of the wheel will preferably have a substantial glaze as well as smoothness, so that when the wheel is used on a carpet the latter will receive minimum wear.

Where a separate outer strip is used, its outer surface should be of maximum smoothness and it can be treated in a suitable manner to produce a glaze and thereby further reduce the coefficient of friction.

By my invention a wheel is provided which can be satisfactorily used on a smooth hard floor or on a carpeted floor, and therefore in many instances it is unnecessary to manufacture as heretofore the different wheels for different respective uses. Where, for example, in the offices of a large business organization there are rooms with hard, smooth floors and others with carpeted floors, it is no longer necessary to assign a given piece of furniture to a room or keep it in a room having a certain kind of floor covering. Also, in the case of a carpeted floor there is in addition to the cushioning of the furniture by the carpet a cushion effect in the caster itself.

While I have shown two embodiments of my invention, it will be understood that the invention can take other forms or embodiments, and that various modifications and changes in details can be made without departing from the principles involved or the scope of the appended claims.

What I claim is:

1. A furniture caster having a wheel with an elastic cushion portion therein at the outer part and a relatively harder peripheral floor-engaging skin portion supported by the cushion adapted to flex with said cushion under load on an uncarpeted floor to engage over an extended area thereof, the hardness of said portion adapting it for use on carpeted surfaces.

2. A furniture caster such as set forth in claim 1, in which the floor-engaging portion has a smooth glazed finish.

3. A furniture caster such as set forth in claim 1, in which the floor-engaging portion is a hardened outer portion of the cushion.

4. A furniture caster such as set forth in claim 1, in which the floor-engaging portion is formed as a separate layer vulcanized to the cushion.

5. A furniture caster wheel of resilient material comprising an interior part or core of hard material, a soft cushion surrounding the core, and a flexible rim of only slightly less hardness than the core supported by the cushion and yielding with the cushion under load to conform to the floor over a relatively large area.

WALTER F. HEROLD.